United States Patent [19]

Lahl, Jr.

[11] Patent Number: 5,367,129

[45] Date of Patent: Nov. 22, 1994

[54] BOWLING BALL TOTAL WEIGHT/TOP WEIGHT SCALE

[76] Inventor: Clarence G. Lahl, Jr., 881 Penny's Dr., Brunswick, Ohio 44212

[21] Appl. No.: 1,448

[22] Filed: Jan. 7, 1993

[51] Int. Cl.[5] .................... G01G 19/22; G01G 23/18; G01G 3/08; G01M 1/12
[52] U.S. Cl. .................. 177/229; 73/65.02; 177/46; 177/50; 177/25.13
[58] Field of Search ............. 177/229, 46, 50, 25.13, 177/262, 25.14, 1, 256; 73/65.02, 65.01

[56] References Cited

U.S. PATENT DOCUMENTS

| | | | |
|---|---|---|---|
| 4,233,846 | 11/1980 | Taylor | 73/460 |
| 4,359,099 | 11/1982 | Henslin | 177/256 X |
| 4,407,154 | 10/1983 | Hardman et al. | 73/66 |
| 4,602,693 | 7/1986 | Racicot | 177/262 |
| 4,742,620 | 5/1988 | Manker | 33/510 |
| 4,785,896 | 11/1988 | Jacobson | 177/211 |
| 4,981,185 | 1/1991 | Turtinen et al. | 177/25.14 |
| 4,981,186 | 1/1991 | Shankle et al. | 177/1 X |
| 5,072,799 | 12/1991 | Freeman et al. | 177/154 |
| 5,190,117 | 3/1993 | Freeman et al. | 177/244 |

Primary Examiner—Benjamin R. Fuller
Assistant Examiner—Randy W. Gibson
Attorney, Agent, or Firm—Reese Taylor

[57] ABSTRACT

A scale for measuring total weight/top weight of a bowling ball includes the utilization of a pair of electronic load cells supporting a moment transfer plate with the load cells being connected to a meter. In one form of the invention, the ball is centered over the load cells with its heavy spot in predetermined alignment so as to affect one load cell differently than the other. The ball is weighed simultaneously by both load cells, the total weight is determined by adding the outputs and the difference in output is used by the meter to calculate the top weight which is displayed. In another form of the invention, both a top weight and a total weight load cell are provided and the meter calculates the top weight directly from the top weight load scale.

15 Claims, 6 Drawing Sheets

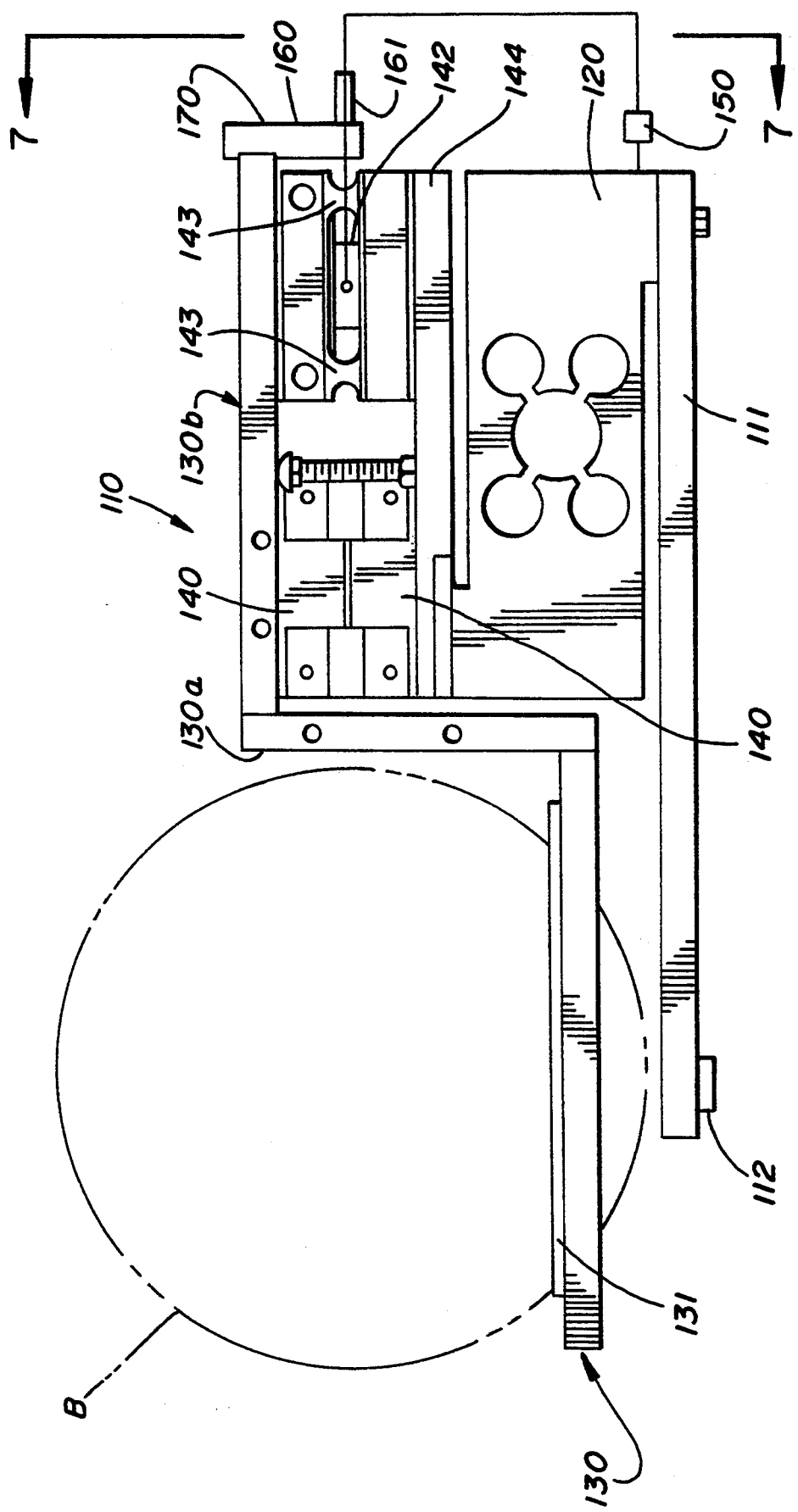

BOWLING BALL TOTAL WEIGHT/TOP WEIGHT SCALE

BACKGROUND OF THE INVENTION

This invention relates in general to scales and relates in particular to electronic scales for weighing bowling balls and determining the total weight and top weight thereof.

DESCRIPTION OF THE PRIOR ART

In the sport of bowling, the weight, drilling pattern and many other factors are important in obtaining an effective bowling ball. Therefore, bowling balls are manufactured without any finger or thumb holes in them and later drilled to the individual bowler's specifications at a dealer's shop or a pro shop.

In the manufacture of the bowling balls, a so-called "heavy spot" is cast into the ball and that heavy spot becomes important when drilling finger holes in the ball at the pro shop. The location and depth of the holes is determined by the location and "top weight" of this heavy spot. The top weight which the ball has is determined by the mass of the heavy spot and where that mass is located relative to the center of the ball. This weight is also called the "moment" weight and is a function of both weight and distance being defined as an ounce of weight at an imaginary circle within the ball. During manufacture, the manufacturer locates the heavy spot and marks the ball. He then reports the initial top weight of the ball to the bowling ball seller or pro shop and that weight is expressed in "ounces of top weight." By custom, one ounce of this top weight is equal to 3.294 ounce-inches of torque.

During drilling of the ball, it is essential that the operator monitor the changes in total and top weight for the customer so as to insure that the ball will perform as desired when thrown by the individual bowler. While there are mechanical top weight scales now in use for determining the total weight and top weight of the ball, they are not particularly accurate and are cumbersome to use. They generally are beam-type scales which require the user to align the heavy spot, weigh the ball and then rotate it 180° and reweigh it. Subtracting the two results then gives the top weight. This is obviously a slow process. There are also scales used in ball production settings which do employ flexures and load cells, but, in those arrangements, separate scales are required for top and total weight and the operator is required to handle the ball twice.

It is, therefore, felt desirable to produce single electronic total weight/top weight scales which can be produced at low cost so as to be affordable to the pro shops and rugged and reliable enough for continuous use in the field. It is also desirable that such a scale be easy to use and that it minimizes handling by the operator.

SUMMARY OF THE INVENTION

Therefore, it is a principal object of this invention to provide a low cost, rugged and easy to use electronic total weight/top weight scale capable of ascertaining both values quickly and accurately.

In furtherance of that object, it has been found that utilization of single point load cells associated with an adjustable locating ring for receiving the ball will permit both the total weight and the top weight to be accurately reported on an electronic weight meter using the output from the load cells.

It has also been found, in a modified version of the invention, that the principal object of the invention can be achieved by utilization of a single load cell and a transducer flexure assembly to, again, ascertain top weight and total weight in a single operation.

Accordingly, production of an improved electronic bowling ball total weight/top weight scale becomes the principal object of this invention with other objects thereof becoming apparent from a reading of the following brief specification considered and interpreted in view of the accompanying drawings.

BRIEF DESCRIPTION OF THE DRAWINGS

FIG. 6 is a side elevational view taken along the line 6—6 of FIG. 5.

BRIEF DESCRIPTION OF THE PREFERRED EMBODIMENTS

Figure 1:
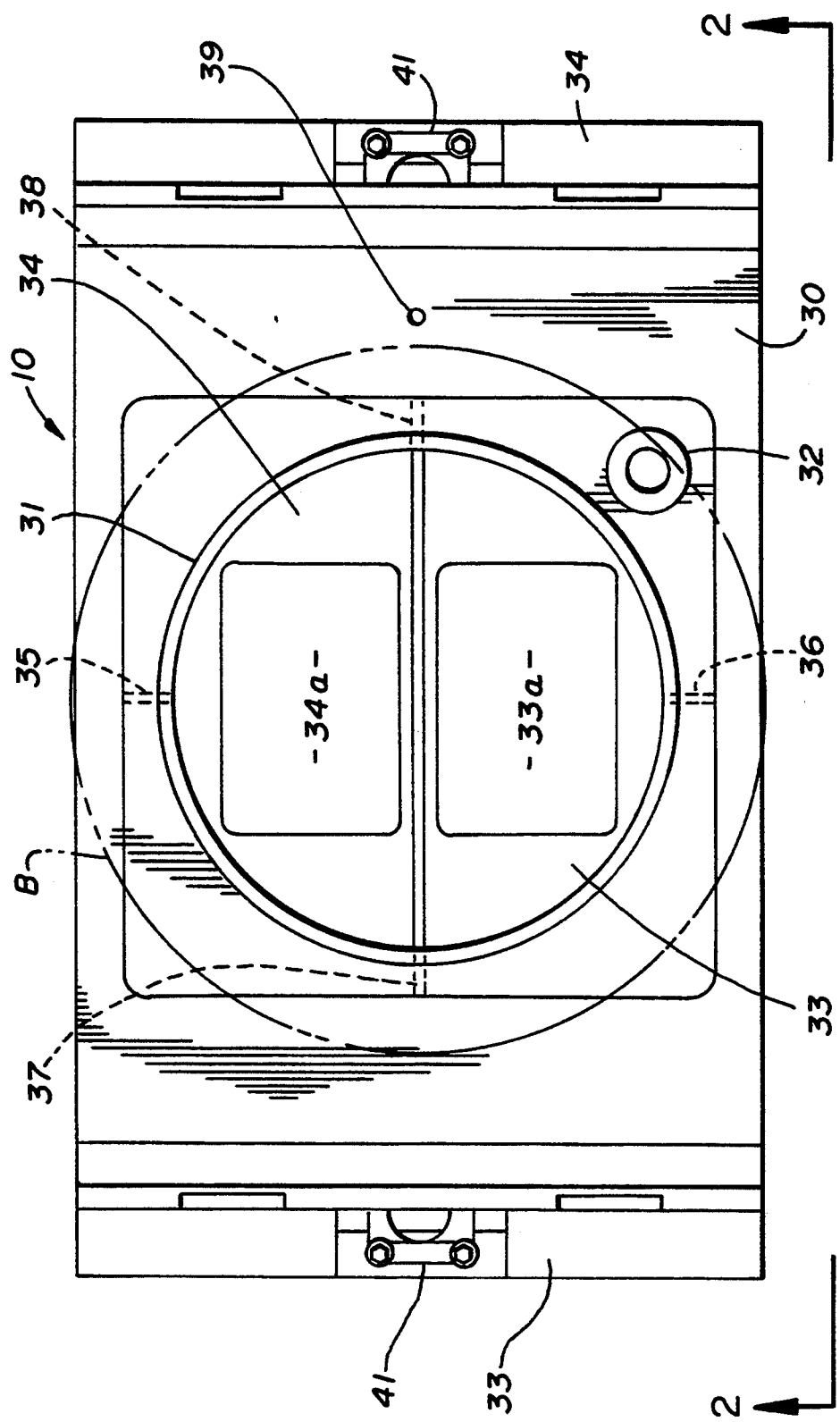
FIG. 1 is a top plan view of an improved total weight/top weight scale.
Figure 2:
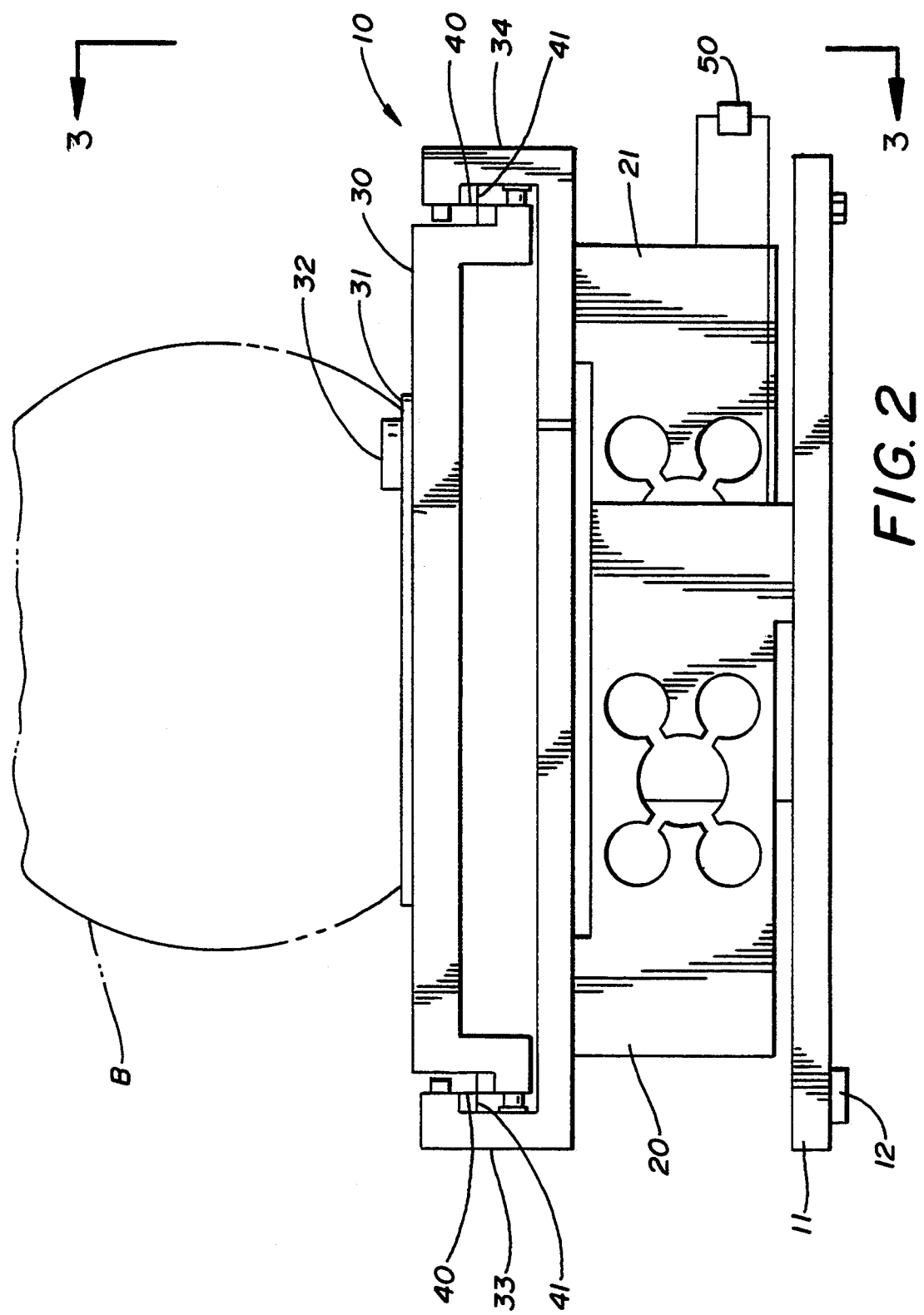
FIG. 2 is a side elevational view of the scale of FIG. 1 taken along the line 2—2 of FIG. 1.
Figure 3:
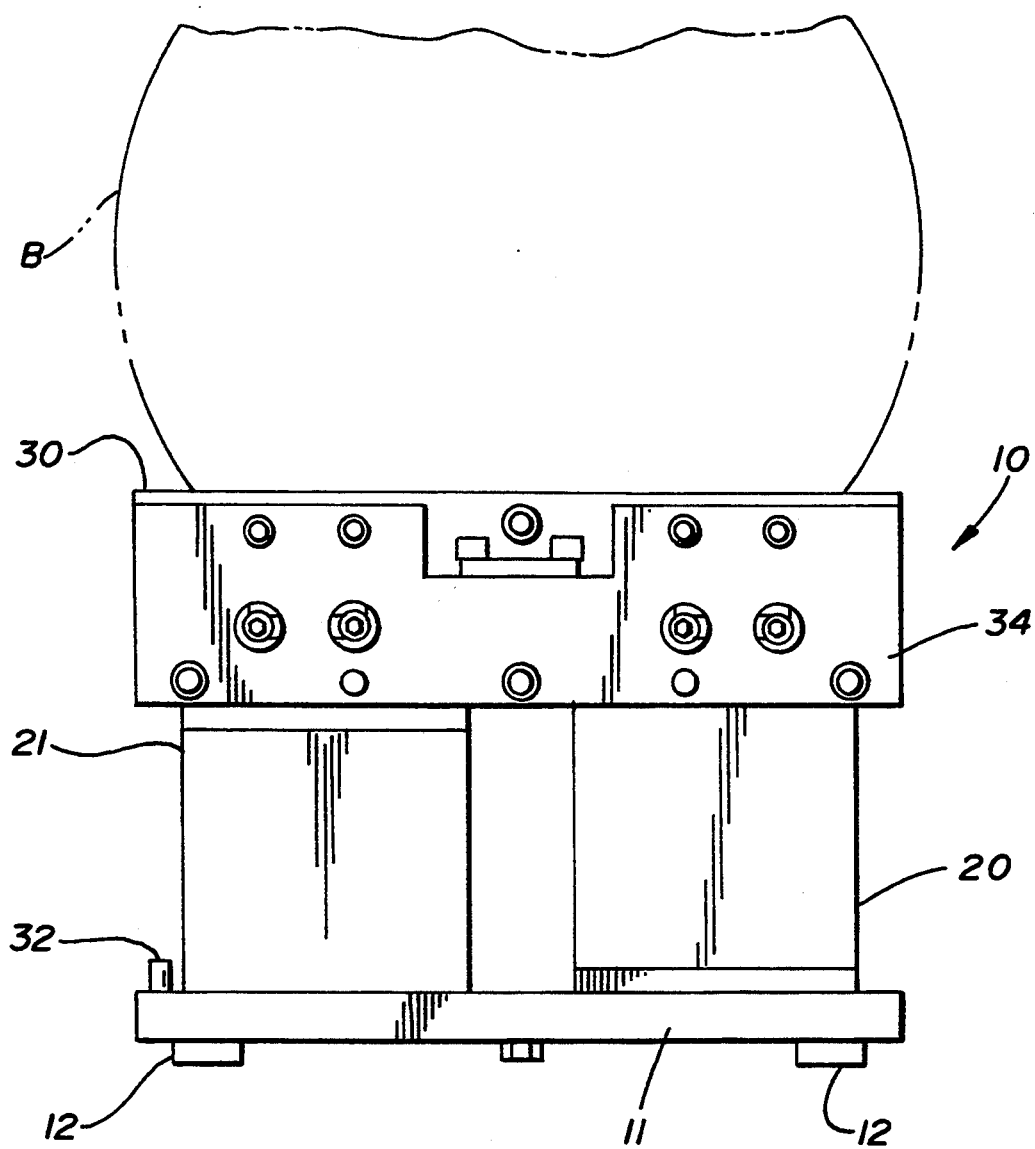
FIG. 3 is an end elevational view taken along the line 3—3 of FIG. 2.

Referring first to FIGS. 1, 2 and 3 of the drawings, it will be seen that the improved total weight/top weight scale, generally indicated by the numeral 10, includes a base plate 11, a first load cell 20, a second load cell 21, and a moment transfer platter 30 carrying a locating ring 31.

Still referring to FIG. 1 of the drawings, it will be noted that the base plate 11 is a generally flat plate of metal, or some similar material, and has leveling feet 12,12 which can be utilized to precisely level the base plate and, thus, the remaining components of the scale. To that end, a bubble level 32 is mounted on the locating ring 31.

First and second sub-platters 33,34 are mounted on top of first and second load cells 20 and 21 and secured to moment transfer platter 30 by flexures. Thus, the moment transfer platter 30 is suspended on sub-platters 33 and 34 by vertical suspension flexures 40,40 and cross flexures 41,41 by suitable means. While cross flexures 41,41 are illustrated and will provide further stability if desired, it is believed that their use is optional.

Moment transfer platter 30 also receives, as previously noted, a locating ring 31. This ring is secured by locking screws 35,36 and includes centering screws 37,38 which enable the ring 31 to be centered relative to moment transfer plate 30 and the load cells 20 and 21 and locked into position so as to insure proper positioning of ball B.

Finally, it will be noted that sub-platters 33 and 34 contain calibration weight locating depressions 33a,34a and that moment transfer platter 30 carries indicia 39 for aligning the heavy spot of the ball during operation.

In operation of the form of the invention illustrated in FIGS. 1 through 3, following leveling by use of feet 12,12 and bubble level 32, centering of locating ring 31 by screws 37,38 and calibration of load cells 20 and 21, the bowling ball will be placed on the locating ring 31 and the heavy spot will be aligned with indicia 39 so that the effect of the mass is at the extremes.

The effect of the ball on the ring 31 and, thus, on the moment transfer platter 30 must be transferred by some means to the load cells 20,21. That is, each end of the moment transfer platter 30 must push on one of the load cells, but cannot be bolted directly thereto. Otherwise, the load cells 20,21 would behave as a single unit and would not be able to differentiate top weight.

The force is transferred in many weighing devices by use of knife edges in V-shaped blocks or by use of spring steel flexures. While knife edges work well, they are subject to wear and breakage in use and, therefore, stainless steel flexures such as 40,40 have been employed and are preferred.

For accurate results, the ball must rest exactly centered between the flexures and, to that end, the flexures are mounted to precisely machined surfaces at the ends of the moment transfer platter 30. Likewise, the locating ring 31 is intended to be centered as previously mentioned.

The suspension flexures 40,40 are used to transmit the effects of the mass of the bowling ball B to the load cells 20 and 21. These are flexible to allow weight distribution on the moment transfer platter 30 to effect the load cells 20 and 21 individually.

It will also be noted that the suspension flexures 40,40 are arranged between the moment transfer platter 30 and the sub-platters 33 and 34. Weight on the moment transfer platter 30 will pull down on the suspension flexures 40,40 and the flexures will then pull down on the sub-platters 33 and 34, following which the sub-platters push down on the load cells 20,21.

The sub-platters 33 and 34 perform two major functions. First, they are used to transfer the effects of the ball weight to the load cells 20 and 21. They are also utilized for locating test weights for calibration purposes.

The calibration function can be performed, for example, by placing five-pound weights in the weight locating depressions 33a,34a of sub-platters 33 and 34 and the readings on the meter 50 can be added for total weight. Converting to ounces and using the previously mentioned conversion factor, the top weight can be determined.

It will also be noted that since the moment transfer platter 30 is suspended from flexures, there is some potential for lateral vibrations. Therefore, cross flexures 41,41 can be used to stop this vibration and can be mounted between the moment transfer platter 30 and the sub-platters 33 and 34 in 90° relationship to the suspension flexures 40,40. However, cross flexures of this type may reduce accuracy somewhat and can be eliminated if desired.

Once the ball has been placed on locating ring 31 with the heavy spot located in alignment with indicia 39 so as to have a greater effect on one load cell than the other, the load cell outputs will be transmitted to meter 50. This meter will then add the output of the two meters to determine total weight. Inasmuch as the output of one load cell will be greater than the other due to the alignment of the heavy spot on the ball, the top weight can be calculated electronically by the meter 50, converted to ounces of top weight and displayed.

The meter may be a microprocessor unit suitably programmed to perform these functions. Alternatively, a simpler, less expensive analog meter can be employed.

Figure 4:
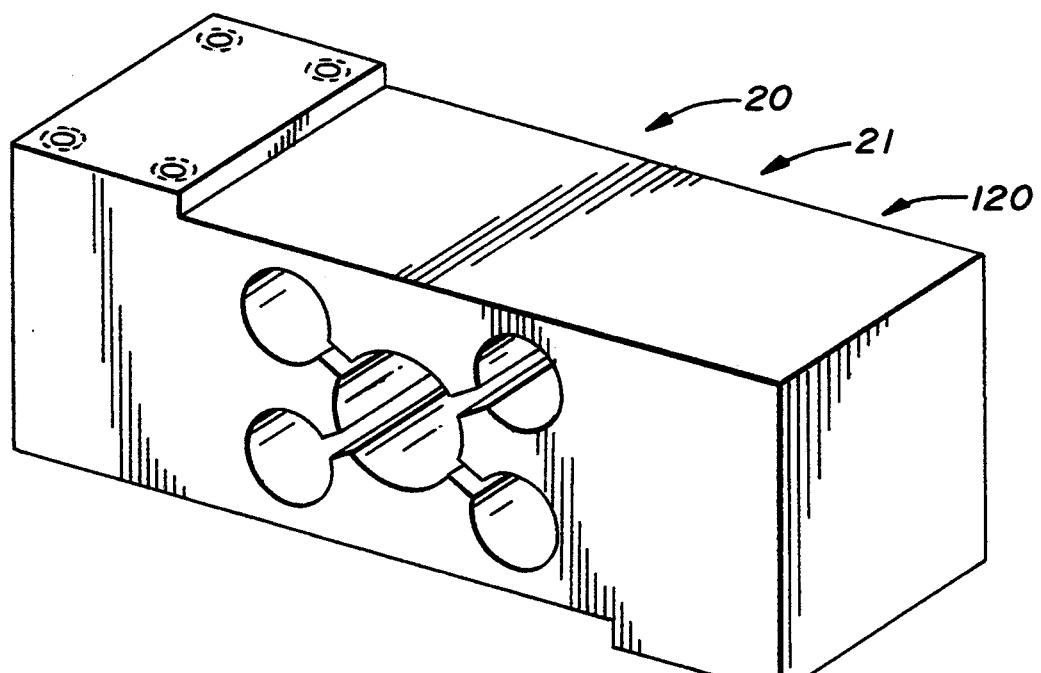
FIG. 4 is a perspective view of an exemplary load cell for use in the invention.

A single point load cell which may be employed in the invention is a Model AWS Brick 200 load cell, such as shown in FIG. 4, available from Advance Weight Systems, Inc. of Grafton, Ohio. This load cell is a dependable and highly accurate load cell adapted for industrial processes and is machined from a single block of aircraft aluminum alloy and includes sensing elements and four conductor-shielded cables potted in a caustic-resistant material. This load cell presents a large footprint and a four-hole bolt pattern, providing a reliable and secure mounting. While the Advance Weight Systems load cell just described is believed admirably adapted for use in the scale of the present invention, it will be understood that the invention is not intended to be so limited and that any single point load cells possessing comparable operational characteristics could also be used.

Figure 7:
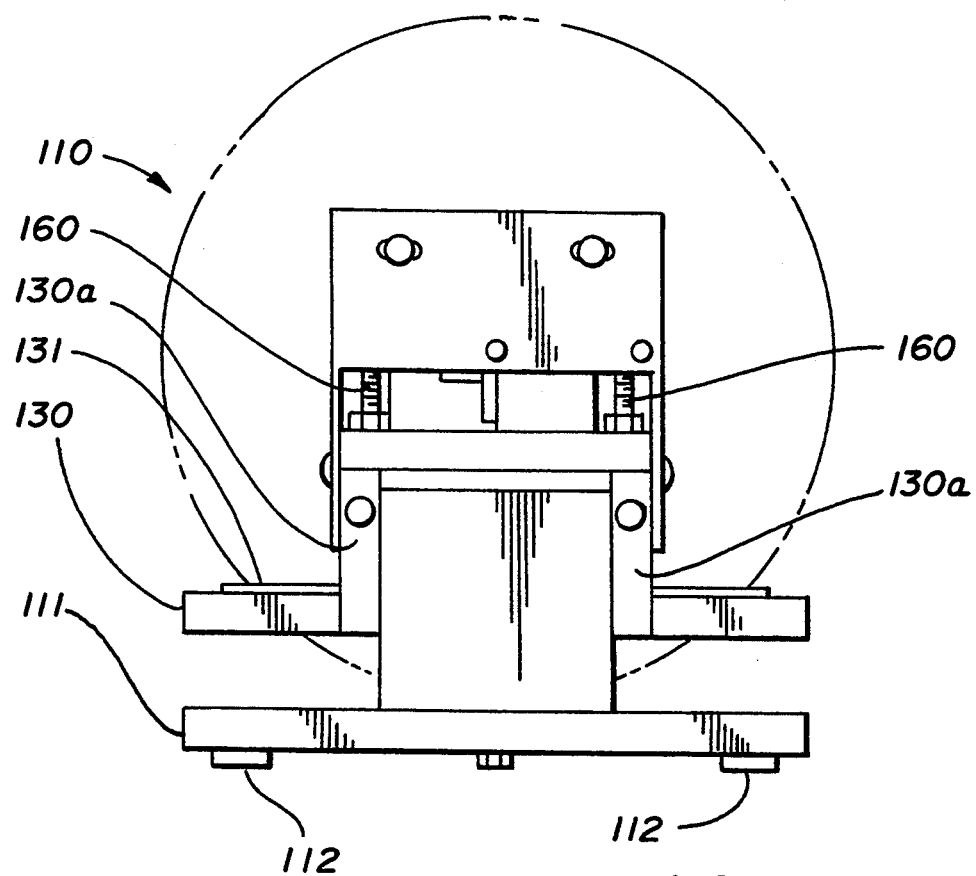
FIG. 7 is an end elevational view taken along the line 7—7 of FIG. 6.
Figure 5:
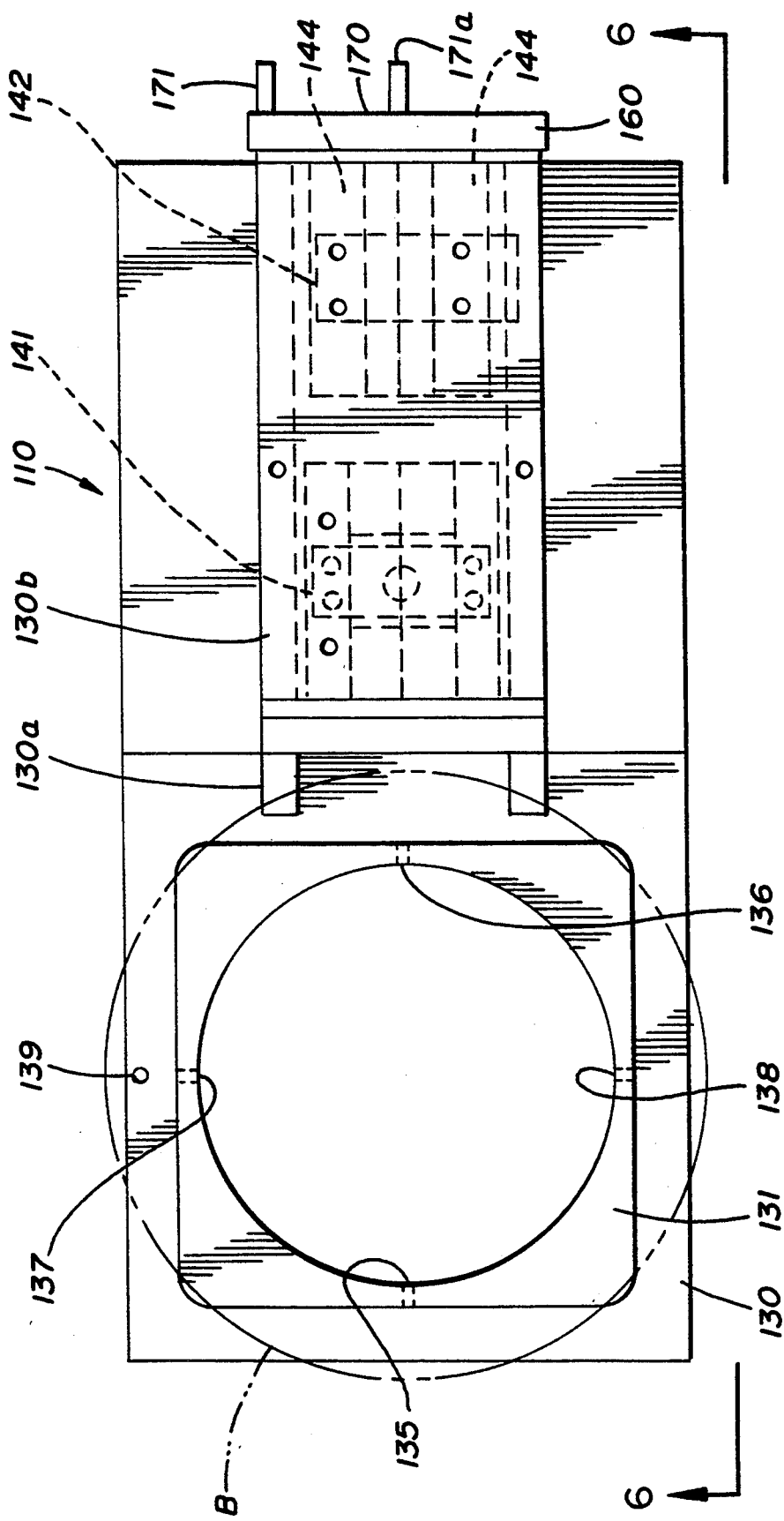
FIG. 5 is a top plan view of a modified form of the invention.

Turning next to FIGS. 5 through 7 of the drawings for a description of a modified form of the invention, it will be noted that the base plate 111 also includes leveling feet 112,112 and a total weight load cell 120. The moment transfer platter 130 receives a locating ring 131 into which the ball B is inserted. The locating ring 131 is mounted on the moment transfer platter 130 by locking screws 135 and 136 and centering screws 137,138 for centering purposes as previously described in connection with the form of the invention illustrated in FIGS. 1 through 3 of the drawings.

The moment transfer platter 130 is connected to first legs 130a, 130a which are, in turn, connected to second legs 130b, 130b which are mounted, as can be seen in FIG. 5 of the drawings, on top of cross flex blocks 140,140. These blocks are mounted above total weight load cell 120 and receive a cross flexure 141 for purposes which will be described.

Also mounted above the total weight load cell 120 is a top weight transducer 142 carried by suspension flexure 143 which is, in turn, mounted on a transducer block 144 with this assembly effectively comprising a second or top weight load cell.

Adjustable overload stops 160,160 are also provided to prevent damage to the load cell and transducer. A calibration plate 170 and calibration pins 171,171a are also provided at the ends of legs 130b, 130b. In this form of the invention, calibration can be accomplished by using a precision test weight suspended from pins 171,171a.

In use or operation of the form of the invention illustrated in FIGS. 5 through 7 of the drawings, it will be appreciated that the top weight load cell, which is comprised of transducer 142, transducer blocks 144,144, suspension flexures 143,143, cross-flex blocks 140 and cross-flexure 141 is employed to calculate the top weight and the total weight load cell 120 is utilized to calculate the total weight. The ball B will be set on the previously centered locating ring 131 and the ball will be turned to position the heavy spot marker affixed by the manufacturer to a specific direction in alignment with indicia 139.

The meter 150 will then use the output from the top weight load cell, which rests on the total weight load cell, ignoring the mass of the top weight load cell structure, to calculate the top weight. The output of the total weight load cell from the weight of the ball will also be received by the meter and the display will show ounces of top weight and pounds of total weight.

While a full and complete description of the invention has been set forth in accordance with the dictates of the Patent Statutes, it should be understood that modifications can be resorted to without departing from the spirit hereof or the scope of the appended claims.

What is claimed is:

1. A scale for measuring total weight and top weight of a bowling ball, comprising:
   a) a moment transfer plate for receiving the bowling ball;
   b) at least two electronic load cells, coupled to said moment transfer plate by flexure means for flexibly suspending said moment transfer plate;
   c) a meter, connected to said load cells for calculating said top weight and total weight and displaying at least one of said total weight and said top weight when the ball is placed on said moment transfer plate; and
   d) a locating ring attached to said moment transfer plate and centered with respect to said flexure means for reception of the bowling ball.

2. The scale of claim 1 wherein said locating ring is adjustable relatively of said moment transfer plate.

3. The scale of claim 1 wherein indicia are provided on said moment transfer platter.

4. The scale of claim 1 further characterized by the presence of first and second sub-platters each separately in engagement with one of said load cells.

5. The scale of claim 4 wherein said moment transfer platter is suspended on said first and second sub-platters.

6. The scale of claim 5 wherein said moment transfer platter is attached to said sub-platters by vertical flexures.

7. The scale of claim 6 wherein said moment transfer platter is attached to said sub-platters by cross flexures.

8. The scale of claim 1 further characterized by the presence of means for leveling the scale.

9. The scale of claim 1 wherein one of said load cells comprises a transducer, cross-flexure and transducer block assembly.

10. The scale of claim 1 wherein a base is provided; and at least one of said load cells is mounted on said base.

11. The scale of claim 1 wherein said moment transfer plate is connected to a vertical leg which, in turn, is connected to a horizontal leg; and said horizontal leg is secured to one of said load cells.

12. The scale of claim 11 wherein calibration means are carried by said horizontal leg.

13. The scale of claim 4 wherein calibration means are carried on each of said sub-platters.

14. A method of determining top weight and total weight of a bowling ball, comprising the steps of:
   a) supporting the ball on a locating ring centered over a pair of load cells;
   b) locating a heavy spot of the ball in a predetermined position relative to two single point load cells so as to have a greater effect on one of the cells than another of the cells;
   c) transmitting outputs of the load cells to an electronic meter;
   d) adding, by means of the meter, the outputs of the load cells to determine said total weight of the ball; and
   e) calculating the top weight by subtracting the differing outputs of each of the load cells from one another and displaying a resulting difference in ounces of top weight.

15. A method of determining top weight and total weight of a bowling ball, comprising the steps of:
   a) supporting the ball on a locating ting connected to a top weight load cell and a total weight load cell;
   b) locating a heavy spot of the ball in a predetermined position relative to one of the load cells;
   c) transmitting the outputs of the load cells to an electronic meter; and
   d) displaying an output of said meter in ounces of top weight and pounds of total weight.

* * * * *

UNITED STATES PATENT AND TRADEMARK OFFICE
CERTIFICATE OF CORRECTION

PATENT NO. : 5,367,129
DATED : November 22, 1994
INVENTOR(S) : Clarence G. Lahl, Jr.

It is certified that error appears in the above-identified patent and that said Letters Patent is hereby corrected as shown below:

In Column 6, line 31, delete "ting" and substitute therefor —ring—.

Signed and Sealed this

Fourteenth Day of February, 1995

Attest:

BRUCE LEHMAN

Attesting Officer          Commissioner of Patents and Trademarks